Dec. 12, 1950    J. M. CAMPBELL    2,533,712
EXHAUST VALVE WITH LEAK DETECTOR
Filed March 29, 1944    2 Sheets-Sheet 2
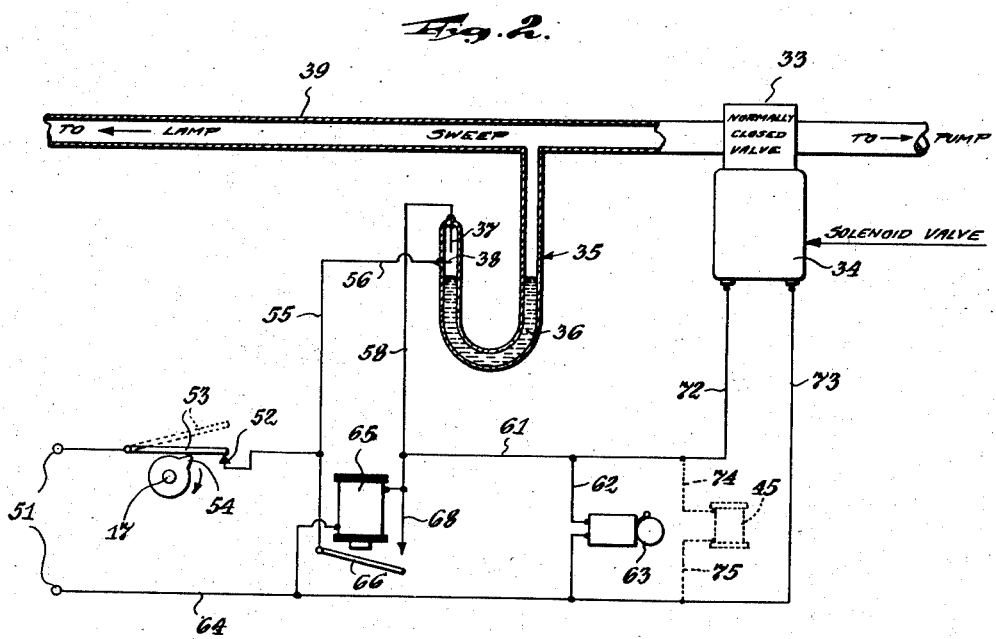
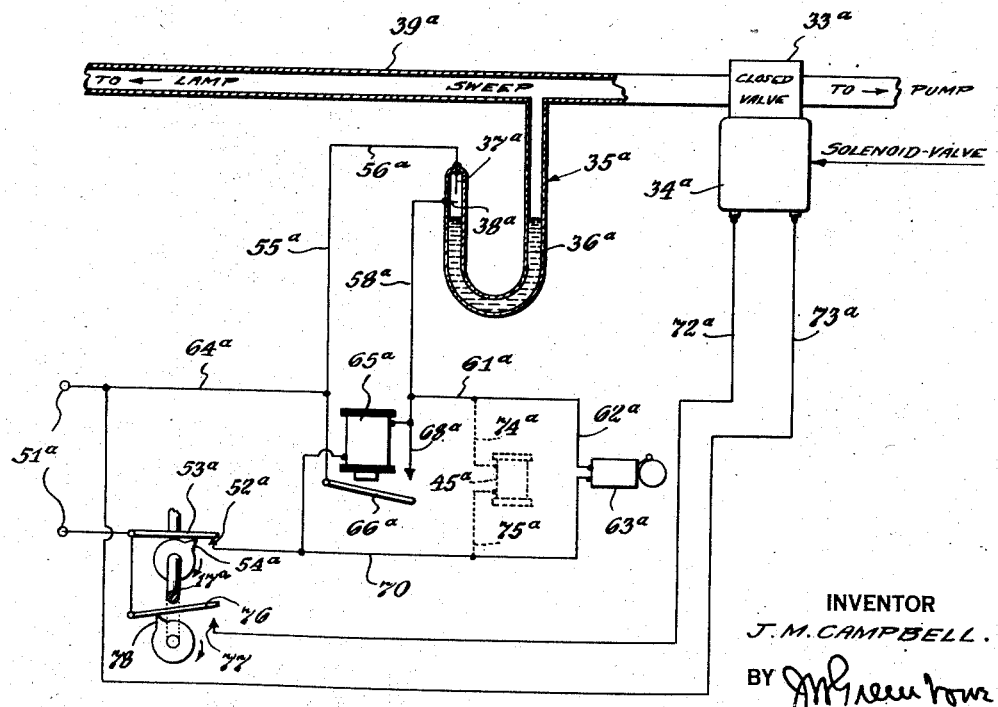
INVENTOR
J. M. CAMPBELL.
BY
ATTORNEY Patented Dec. 12, 1950

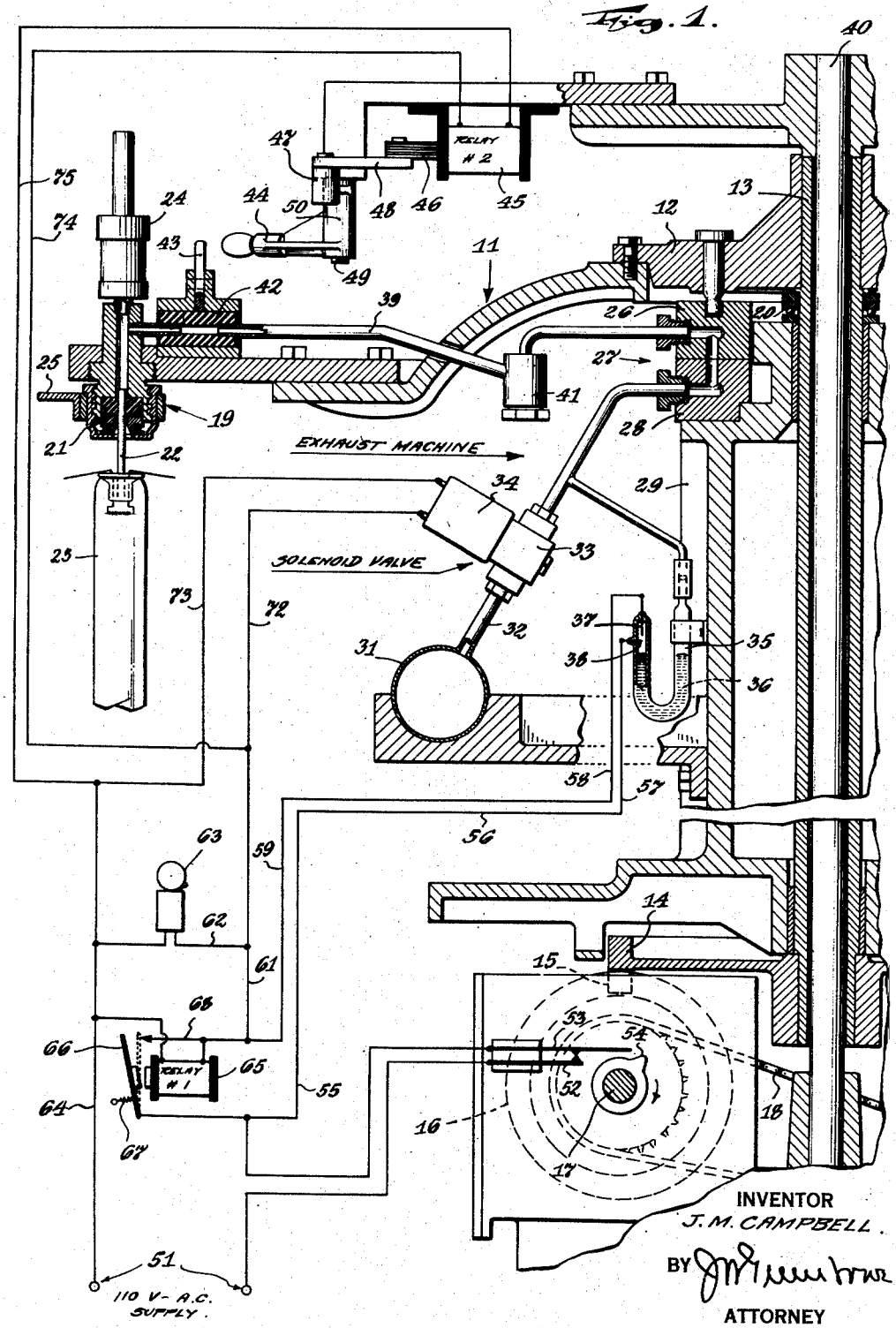

2,533,712

UNITED STATES PATENT OFFICE 2,533,712

EXHAUST VALVE WITH LEAK DETECTOR

John M. Campbell, Fairmont, W. Va., assignor to Westinghouse Electric Corporation, East Pittsburgh, Pa., a corporation of Pennsylvania Application March 29, 1944, Serial No. 528,570

10 Claims. (Cl. 73—40)

This invention relates to machines for gas filling and/or exhausting hollow bodies and particularly to such used for the manufacture of fluorescent lamps and similar devices.

The primary object of my invention, generally considered, is to provide a leak detector for exhaust machines comprising a pressure-responsive circuit making and breaking device, such as mercury U tube with contacts which are opened or closed in accordance with the vacuum condition in the exhaust line, and a relay to prevent breaking of said circuit, as by opening of such mercury contacts while power is on them, in order to thereby avoid damage, such as cracking the glass-to-metal seal or evolving gases which change the sensitivity of said U tube.

Another object of my invention is to provide a method for detecting leaks comprising an energizing circuit to a mercury U tube with contacts in which said tube is connected to the exhaust system, so that a leak causes closing of said contacts and energization of a leak detector, involving shorting out of said contacts upon the development of a leak so that when the vacuum is restored no spark occurs upon opening said contacts.

A further object of my invention is the provision of an exhaust machine with a mercury U tube having contacts connected to the line in one position and a normally-closed solenoid-actuated valve making said line a "dead" port, a circuit to said contacts controlled by a cam switch, a relay in said circuit shorting said mercury contacts when said circuit is energized, in order to avoid the formation of a spark when said contacts are opened, and a leak indicator and said valve controlled by said mercury U tube contacts, whereby upon the development of a leak the mercury in said tube closes the circuit through said contacts, energizing the relay, forming a holding circuit through its armature, and simultaneously energizing said leak indicator and the solenoid to said normally-closed valve to exhaust the line to said lamp.

Other objects and advantages of the invention, relating to the particular arrangement and construction of the various parts, will become apparent as the description proceeds.

Referring to the drawing:

Fig. 1 is a fragmentary vertical sectional view of an exhaust machine embodying my invention, the control circuits being also indicated diagrammatically.

Fig. 2 is a wiring diagram of the embodiment of my invention illustrated in Fig. 1.

Fig. 3 is a wiring diagram corresponding with Fig. 2 but showing a modification.

The present invention may be embodied in any suitable type of exhaust machine, such as used for the progressive evacuation of hollow bodies, and particularly in connection with electric vacuum devices such as fluorescent lamps, incandescent electric lamps, and the like.

Exhaust machines for the above-mentioned purposes are usually provided with two pumps, a preliminary exhaust pump and what is known as a final exhaust pump. The devices to be evacuated are connected with the first or preliminary pump and exhausted as they travel, that is, they are moved from one port to another while on said pump. The same procedure is followed when the devices are subjected to the second or final exhaust pump.

The exhaust machine which I prefer to use is of the type substantially as described and claimed in the Mullan Patent No. 2,113,798, dated April 12, 1938, except as will be specifically described in the present application. It will, therefore, be seen that the exhaust machine in which my invention is embodied comprises a rotatable conveyor 11 having a hub 12 desirably carried on a ball or roller bearing 20 and connected to a hollow shaft 13, driven in any suitable manner as by means of a wheel 14 carrying index roller 15 engaged by a cam wheel 16 on a shaft 17, driven as by a chain 18 from a suitable source of power, such as an electric motor (not shown).

The conveyor 11 carries a plurality of heads 19 which may be generally like those described and claimed in the Gustin Patent No. 2,215,100, dated September 17, 1940, and each having a rubber exhaust member 21 receiving the exhaust tube 22 of the device to be evacuated, such as a fluorescent lamp 23. If used with fluorescent lamps, said heads may each carry a mercury doser 24. Each head is desirably provided with a hand lever 25 for effecting the operation thereof in gripping or releasing the exhaust tube of the device being evacuated.

The conveyor also carries the upper or movable section 26 of the rotatable vacuum valve 27, the lower section 28 of which is mounted on a stationary portion 29 of the machine. Said stationary portion also carries the exhaust lines, the preliminary one of which is indicated at 31, and lines therefrom, one of which is designated 32, through normally closed valve 33, operated by solenoid 34, to the stationary valve section 28. In the present embodiment, the line 32 which may correspond with that of position "4" of Fig.

5 of the Mullan Patent No. 2,254,905, of September 2, 1941, also communicates with a U tube 35 carrying mercury 36 and provided with contacts 37 and 38, uncovered by the mercury when a normal vacuum is maintained in the system, but closed by being submerged in the mercury when the pressure in said system reaches a predetermined point, as due to the development of a leak between the valve 33 and the extreme outer end of the line.

The line 39 between the movable portion 26 of the valve 27 and the head 19 is desirably provided with a trap 41 and a valve 42, corresponding with the rubber tube connection 93 and pinch clamp 91 of the Mullan Patent 2,254,905, previously referred to, normally open but adapted to be closed upon movement of the camming pinch clamp or bell crank lever 43, either manually, or automatically as by engagement of the operating arm 44 when moving outwardly toward the lever 43, as viewed in Fig. 1. The valve 42, when cammed shut by the lever 43, stays in that position until opened, as will be understood. This closing is accomplished upon energization of the relay 45, supported on stationary rod 46, to draw its armature 46 to the right and pull the arm 47 of the bell crank lever 50 in the same direction by connecting link 48, to rotate the operating roller-carrying arm 44 of said crank about its pivot 49.

The circuit for effecting the desired operation of the leak detector is from a suitable source of power 51, such as a 110 volt A. C. supply, through spring contacts 52 and 53, normally closed but opened every time the shaft 17 turns, as by engagement of the cam 54 with the upper contact member 53, through lines 55, 56 and 57 to contact 38, through the submerging mercury 36 when a leak occurs to contact 37, through lines 58, 59, 61 and 62 to electric bell 63, or other leak indicating device, and from there back through line 64 to the other terminal of the supply.

In order to prevent the development of a spark in the mercury U tube 35 when the mercury returns to the normal position illustrated, if at that time the contacts 52 and 53 are closed as illustrated, I provide a relay or holding solenoid 65 which is energized simultaneously with the bell 63 to draw its armature 66 against the action of the spring 67 to close a shorting circuit through line 68 between lines 59 and 55, to thereby take the current which would otherwise flow through lines 56, 58 and the contacts 37 and 38 when connected.

Inasmuch as it is desired to keep the line 32 evacuated between the valve 33 and the stationary valve portion 28, so as not to destroy the vacuum of the succeeding line 39 upon corresponding movement of the movable valve portion 26, energization of the bell or leak indicator 63 is also desirably accompanied by energization of the solenoid 34 to open the valve 33 to the vacuum pump, as well as by energization of the relay 45 through lines 74 and 75 to close the valve 42 and thereby cut off the leaky head 19 from the exhaust system.

From the foregoing it will be seen that the operation of detecting a leak, as illustrated diagrammatically in Fig. 2, is as follows:

The lamp or other device being evacuated is supposed to be at the left end of the exhaust line 39 termed the sweep. This line is normally "dead" or separated from the pump by the normally-closed valve 33 controlled by solenoid 34. If a leak occurs causing pressure in the sweep to move the mercury 36 sufficiently to submerge contacts 37 and 38, after the cam 54 allows the switch 53—52 to close, current flows from supply 51, through contacts 53 and 52, lines 55 and 56, contacts 38 and 37, line 58, relay 65 and line 64, back to supply 51. The energization of the relay 65 draws its armature 66 to close a circuit through line 68 paralleling and shorting that through the contacts 37 and 38. At the same time the circuit through lines 61, 62 and 64 operates the bell 63 or other leak detector.

The parallel circuit through lines 72 and 73 also energizes the solenoid 34, opening the valve 33 to the pump for restoring the vacuum in the sweep and attempting to bring the mercury column back to the original or zero level. Even if the opening of the valve 33 restores the vacuum sufficiently to uncover the contacts 37 and 38, there is no spark because of the holding or short circuit through the armature 66. It is also desirable, although not essential, that the parallel circuit through lines 74 and 75 energize relay 45 and thereby effect closing of the normally open valve 43 to cut off the leaky head 19 from the vacuum system, until said head has been repaired.

The final event of the cycle is that the cam 54 separates the contacts 53 and 52, and the apparatus is ready to detect a leak in the succeeding head and/or sweep upon corresponding movement of the conveyor 11 and movable valve section 26.

From the foregoing it will be seen that my leak detector operates on a "dead" port, or one blocked from the pump by a closed solenoid valve, the leak causing pressure to close a mercury switch, which during the closure of a circuit by a switch, operated as by a cam driven from the conveyor for the vacuum head, energizes a solenoid the armature of which is moved to establish a short circuit around the mercury switch contacts. At the same time a bell, or other indicator, shows a leak and the solenoid valve opens while the cam-operated switch maintains the circuit and, even if the opening of this valve causes the mercury to uncover the contacts therein, there is no spark because of said short circuit. Upon opening of the cam-operated switch, as the conveyor turns, the circuit is de-energized and the apparatus is ready to detect another leak.

In case it is desired to detect a leak in a lamp on a "dead" port, or one which does not evacuate the lamp, while at the same time not losing a pumping position by making the operation of the normally-closed solenoid valve dependent on the development of a leak, I use a compromise arrangement such as illustrated diagrammatically in Fig. 3, and in which corresponding parts are designated by the same number with the letter $a$ affixed.

The lamp or other device being evacuated is supposed to be at the left end of the exhaust line or sweep 39a, as in Fig. 2. This line is "dead" during the detection of the leak, but is controlled by a switch 76—77 operated by a cam 78, desirably driven along with the conveyor 11 as by being on the shaft 17a that carries the cam 54a which operates the switch 52a—53a. This switch 76—77 desirably opens just after indexing of each lamp for a small portion of a cycle, say for four seconds out of every thirty seconds. The port is only "dead" by closure of the solenoid valve 33a during the selected short interval of time, such as four seconds, during which the detection of the leak occurs as in the preceding embodiment.

Specifically, if a leak occurs causing pressure in the sweep to move the mercury 36ª sufficiently to submerge the contacts 37ª and 38ª, after the cam 54ª allows the switch 53ª—52ª to close, current flows from supply 51ª through contacts 53ª and 52ª, relay 65ª, line 58ª, contact 38ª, submerging mercury 36ª, contact 37ª, and lines 56ª, 55ª and 64ª, back to supply 51ª. The energization of the relay 65ª draws its armature 66ª to close a circuit through line 68ª, paralleling and shorting that through the contacts 37ª and 38ª. At the same time the circuit through lines 61ª, 62ª and 70 operates the bell 63ª or other leak detector. It is also desirable as in the previous instance, although not essential, that a parallel circuit, as through lines 74ª and 75ª, energize a relay 45ª and thereby effect closing of a normally-open valve, corresponding with valve 43 in Fig. 1, to cut off the leaky head from the vacuum system until said head has been repaired.

After the leak has been detected, which occurs during the period illustrated when switch 76—77 has been opened by cam 78, continued turning of said cam allows said switch 76—77 to close, thereby energizing the solenoid 34ª through lines 72ª and 73ª to open the valve 33ª to connect the sweep and corresponding head to the pump, thereby not losing pumping action, except for the short period of time when the switch 76—77 is open during the leak-detecting operation.

The final event of the cycle is that the cam 54ª again separates the contacts 53ª and 52ª and the apparatus is ready to detect a leak in the succeeding head and/or sweep, upon corresponding movement of the conveyor and movable valve section.

It will thus be seen that my leak detector may also be made to operate on a port which is only "dead" for a small fraction of the cycle, the leak causing pressure to close a mercury switch which, during the closure of a circuit by a switch operated as by a cam driven from the conveyor for the vacuum head, energizes a solenoid the armature of which is moved to establish a short circuit around the mercury switch contacts. At the same time a bell or other detector shows a leak and the solenoid valve is opened, while the cam-operated switch maintains the circuit, as by another cam-operated switch, to avoid appreciable loss of pumping time. If the closing of the switch 76—77 and the pumping of the sweep causes the mercury valve to uncover the contacts therein, there is no spark because of the short circuit through armature 66ª. Upon opening of the cam-operated switch 53ª—52ª, as the conveyor turns, the circuit is de-energized and the apparatus is ready to detect another leak.

From the foregoing description it will be seen that I have devised a "dead" port leak detector which may, if desired, be used and then said "dead" port made a "live" port to thereby not lose a pumping position, while at the same time giving a positive indication when leaks are detected and providing a mercury U tube circuit which does not deteriorate even with excessive usage. The mercury U tube contacts do not interrupt current and there is thus no tendency to arc, evolve gas, or crack the glass. The mercury column is thus always pumped back to the initial or zero level when the leak is stopped. The bell or other leak detector rings positively from the holding circuit, even if there is a fluctuation or "bouncing" of the mercury column.

It will also be understood that some of the advantages of my invention may be secured even when using a pressure-sensitive circuit-controlling device other than a mercury U tube.

Although preferred embodiments of my invention have been disclosed, it will be understood that modifications may be made within the spirit and scope of the appended claims.

I claim:

1. In combination with an exhaust machine comprising a conveyor with a head to receive the exhaust tube of a device to be evacuated through a vacuum line, a pressure-sensitive circuit controlling device connected to said line, and with contacts so adjusted that under normal vacuum conditions said contacts are electrically disconnected, while when a leak develops in said line the increase in pressure beyond a predetermined point causes said contacts to be electrically connected, a solenoid-controlled valve in said line between the said controlling device connection and said exhaust machine, said valve being normally closed to cut off said line from said exhaust machine, means connecting said contacts including an initially open switch, a holding solenoid the armature of which when operated provides a circuit in parallel with said contacts to a source of electrical energy, the solenoid of said valve and a leak indicator, and means for closing said switch as a device being evacuated is indexed for leak-test, whereby when a leak occurs after the device indexes and the initially-open switch closes, the pressure developed in the exhaust line effects an electrical connection of said contacts allowing current to flow therebetween, energizing the holding solenoid to operate its armature, and establish said holding circuit and a circuit through the leak indicator and energize said valve solenoid.

2. In combination with an exhaust machine comprising a conveyor with a head to receive the exhaust tube of a device, to be evacuated through a vacuum line, a mercury U tube connected to said line, and with contacts so adjusted that under normal vacuum conditions said contacts are electrically disconnected, while when a leak develops in said line the increase in pressure beyond a predetermined point causes the mercury to connect said contacts, a solenoid-controlled valve in said line between the said mercury U tube connection and said exhaust machine, means connecting the solenoid of said valve and said contacts including a switch, a holding solenoid, the armature of which when operated provides a short circuit in parallel with said contacts, to a source of electrical energy and a leak indicator, and means for operating said switch as the conveyor moves, to allow for energization of the solenoid of said valve whereby when a leak occurs, the pressure developed in the exhaust line submerges said mercury U tube contacts, allowing current to flow therebetween, energizing the holding solenoid to operate its armature and establish said short circuit and one through the leak indicator, so that when the circuit opens there is no spark at the mercury U tube contacts.

3. In combination with an exhaust machine comprising a rotatable conveyor with a head including a rubber conduit to receive the exhaust tube of a device to be evacuated through a vacuum line and an arm to effect compression of said conduit to grip said exhaust tube therein, a normally-closed solenoid-operated valve in the vacuum line to said head when said conveyor is in one position, a mercury U tube connected to said line, and with contacts so adjusted that under normal vacuum conditions said contacts are electrically disconnected, while when a leak develops in said line the increase in pressure beyond a predetermined point causes the mercury to submerge said contacts, means connecting said contacts including a cam-actuated switch and a holding solenoid, the armature of which when operated provides a circuit in parallel with said contacts, to a source of electrical energy, and a leak indicator and the solenoid of said valve in parallel with one another, but in series with said contacts and armature, whereby when the cam-actuated switch is closed and a leak occurs, the pressure developed in the exhaust line submerges said mercury U tube contacts and causes a current to flow therebetween, energizing the holding solenoid to operate its armature and establish a circuit through the leak indicator and solenoid of said valve, to restore the vacuum in said line and open the mercury U tube contacts without a spark, until the cam opens its switch and the apparatus is ready to detect another leak.

4. In combination with an exhaust machine comprising a conveyor with a head to receive the exhaust tube of a device to be evacuated through a vacuum line, a relay-controlled normally-open valve near said head and in said line, a mercury U tube connected to said line, and with contacts so adjusted that under normal vacuum conditions said contacts are electrically disconnected, while when a leak develops in said line the increase in pressure beyond a predetermined point causes the mercury to submerge said contacts, a normally-closed solenoid-operated valve in said vacuum line on the opposite side of said U tube connection from said normally-open valve, means connecting through said contacts, the solenoid of said valve including a switch, a leak indicator, and the relay of said normally-open valve, to a source of electrical energy, and means for operating said switch as the conveyor moves, to allow for energization of the solenoid of said valve whereby when a leak occurs, the pressure developed in the exhaust line submerges said mercury U tube contacts, causes current to flow therebetween and establish a circuit through the leak indicator and the relay of said normally-open valve to cut off said head from the vacuum line, and the solenoid of said normally-closed valve.

5. In combination with an exhaust machine comprising a conveyor with a head to receive the exhaust tube of a device to be evacuated through a vacuum line, a relay-controlled normally-open valve near said head and in said line, a mercury U tube connected to said line, and with contacts so adjusted that under normal vacuum conditions said contacts are electrically disconnected, while when a leak develops in said line the increase in pressure beyond a predetermined point causes the mercury to submerge said contacts, a normally-closed solenoid-operated valve in said vacuum line on the opposite side of said U tube connection from said normally-open valve, means including a switch connecting through said contacts, the solenoid of said valve, a holding solenoid, the armature of which when operated provides a short circuit in parallel with said contacts, a leak indicator, and the relay of said normally-open valve, to a source of electrical energy, and means for operating said switch as the conveyor moves, to allow for energization of the solenoid of said valve whereby when a leak occurs, the pressure developed in the exhaust line submerges said mercury U tube contacts, causes current to flow therebetween, energizing the holding solenoid to operate its armature and establish a circuit through the leak indicator, the relay of said normally-open valve to cut off said head from the vacuum line, and the solenoid of said normally-closed valve.

6. In combination with an exhaust machine comprising a conveyor with a head to receive the exhaust tube of a device to be evacuated through a vacuum line, a normally-closed solenoid-operated valve in the vacuum line, a pressure-sensitive circuit-controlling device connected to said line, and with contacts so adjusted that under normal vacuum conditions said contacts are electrically disconnected, while when a leak develops in said line the increase in pressure beyond a predetermined point causes said contacts to be electrically connected, a holding solenoid, a leak indicator, means connecting said contacts including a cam-actuated switch and said holding solenoid, the armature of which when operated provides a short circuit in parallel with said contacts, and said leak indicator in parallel, to a source of electrical energy, whereby when a leak occurs, the pressure developed in the exhaust line effects an electrical connection of said contacts, allowing current to flow therebetween, energizing the holding solenoid to operate its armature and establish a circuit through the leak indicator, until the cam opens the circuit, and means for finally opening the solenoid-operated valve to restore the vacuum in said system.

7. In combination with an exhaust machine comprising a conveyor with a head to receive the exhaust tube of a device to be evacuated through a vacuum line, a normally-closed solenoid-operated valve in the vacuum line, a mercury U tube connected to said line, and with contacts connected through switch means operable as the conveyor moves, and so adjusted that under normal vacuum conditions said contacts are electrically disconnected, while when a leak develops in said line the increase in pressure beyond a predetermined point causes the mercury to submerge and connect said contacts, a holding solenoid, a leak indicator, means connecting said contacts including said switch means and holding solenoid, the armature of which when operated provides a short circuit in parallel with said contacts, and said leak indicator and valve solenoid in parallel to said source of electrical energy, whereby when a device is indexed upon movement of said conveyor and a leak occurs, the pressure developed in the exhaust line closes said mercury U tube contacts, allowing current to flow therebetween, energizing the holding solenoid to operate its armature and establish a circuit through the leak indicator, until the circuit is opened, by said switch means, and the solenoid-operated valve opens to restore the vacuum in said system.

8. In combination with an exhaust machine comprising a conveyor with a head to receive the exhaust tube of a device to be evacuated through a vacuum line, a normally-closed controlled valve in the vacuum line to said head when said conveyor is in one position, a mercury U tube connected to said line, and with contacts so adjusted that under normal vacuum conditions said contacts are electrically disconnected, while when a leak develops in said line the increase in pressure beyond a predetermined point causes the mercury to submerge said contacts, means connecting said contacts, including a switch, operating as the conveyor moves, and a holding solenoid, the armature of which when operated provides a circuit in parallel with said contacts, to a source of electrical energy, and a leak indicator and the control means of said valve in parallel with one another, but in series with said contacts and armature, whereby when the conveyor moves and the switch is closed, the pressure developed in the exhaust line, upon the occurrence of a leak, submerges said mercury U tube contacts and causes current to flow therebetween, energizing the holding solenoid to operate its armature and establish a circuit through the leak indicator and control means of said valve, to restore the vacuum in said line and open the mercury U tube contacts without a spark.

9. In combination with an exhaust machine comprising a conveyor with a head connected to a vacuum line to receive the exhaust tube of a device to be evacuated there-through, a normally-closed solenoid-controlled valve in the vacuum line to said head when said conveyor is in one position, a mercury U-tube connected to said line and with contacts so adjusted that under normal vacuum conditions they are electrically disconnected, while when a leak develops in said line the increase in pressure beyond a predetermined point causes the mercury to submerge said contacts, means connecting the solenoid of said valve and said contacts, including a switch operating as the conveyor moves, and a holding solenoid, the armature of which when operated provides a circuit in parallel with said contacts, to a source of electrical energy, and a leak indicator in series with said contacts and armature, whereby when the conveyor moves and the switch is closed the pressure developed in the vacuum line, upon the occurrence of a leak, submerges said mercury U-tube contacts and causes current to flow therebetween, energizing the holding solenoid to operate its armature and establish a circuit through the leak indicator.

10. In combination with an exhaust machine comprising a conveyor with a head connected to a vacuum line to receive the exhaust tube of a device to be evacuated therethrough, a normally-closed solenoid-controlled valve in the vacuum line to said head when said conveyor is in one position, a mercury U-tube connected to said line and with contacts so adjusted that under normal vacuum conditions they are electrically disconnected, while when a leak develops in said line the increase in pressure beyond a predetermined point causes the mercury to submerge said contracts, means connecting said contacts, including a switch operating as the conveyor moves, and a holding solenoid, the armature of which when operated provides a circuit in parallel with said contacts, to a source of electrical energy, and a leak indicator in series with said contacts and armature, whereby when the conveyor moves and the switch is closed the pressure developed in the vacuum line, upon the occurrence of a leak, submerges said mercury U-tube contacts and causes current to flow therebetween, energizing the holding solenoid to operate its armature and establish a circuit through the leak indicator, and means including another switch closing after the first-mentioned switch as the conveyor moves, connecting the solenoid of said valve to said source of electrical energy, to restore the vacuum in said line after the operation of the leak detector.

JOHN M. CAMPBELL.

REFERENCES CITED

The following references are of record in the file of this patent:

UNITED STATES PATENTS

| Number | Name | Date |
| --- | --- | --- |
| 1,651,865 | Blake et al. | Dec. 6, 1927 |
| 1,933,322 | Fagan | Oct. 31, 1933 |
| 1,951,142 | Foulke | Mar. 13, 1934 |
| 2,025,579 | Donovan et al. | Dec. 24, 1935 |
| 2,162,209 | Truther | June 13, 1939 |
| 2,254,905 | Mullan | Sept. 2, 1941 |